United States Patent
Mukaida et al.

(10) Patent No.: US 11,029,885 B2
(45) Date of Patent: Jun. 8, 2021

(54) MEMORY CONTROLLER FOR CONTROLLING MULTIPLE TYPES OF FLASH MEMORIES, AND MEMORY SYSTEM

(71) Applicant: TDK CORPORATION, Tokyo (JP)

(72) Inventors: Naoki Mukaida, Tokyo (JP); Kenichi Takubo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/576,267

(22) Filed: Sep. 19, 2019

(65) Prior Publication Data
US 2020/0159456 A1 May 21, 2020

(30) Foreign Application Priority Data
Nov. 15, 2018 (JP) .............................. JP2018-214940

(51) Int. Cl.
| | |
|---|---|
| G06F 3/06 | (2006.01) |
| G06F 12/0882 | (2016.01) |
| G06F 9/50 | (2006.01) |
| G06F 8/71 | (2018.01) |
| G06F 12/02 | (2006.01) |

(52) U.S. Cl.
CPC .......... *G06F 3/0659* (2013.01); *G06F 3/0607* (2013.01); *G06F 3/0658* (2013.01); *G06F 3/0679* (2013.01); *G06F 8/71* (2013.01); *G06F 9/5016* (2013.01); *G06F 12/0882* (2013.01); *G06F 12/0246* (2013.01)

(58) Field of Classification Search
CPC .... G06F 3/0659; G06F 3/0607; G06F 3/0658; G06F 3/0679; G06F 9/5016; G06F 12/0882; G06F 12/0246
See application file for complete search history.

(56) References Cited

U.S. PATENT DOCUMENTS

| | | | |
|---|---|---|---|
| 2005/0160217 A1 | 7/2005 | Gonzalez et al. | |
| 2007/0005875 A1* | 1/2007 | Oshima | G06F 11/1417 711/103 |
| 2016/0042810 A1* | 2/2016 | Lee | G06F 11/1417 714/723 |

FOREIGN PATENT DOCUMENTS

JP   2007-518166 A   7/2007

* cited by examiner

*Primary Examiner* — Michelle T Bechtold
(74) *Attorney, Agent, or Firm* — Oliff PLC

(57) ABSTRACT

A memory controller controls access to a flash memory including a plurality of physical blocks, each of which includes a plurality of pages, based on a command assigned from a host system. The memory controller allocates a physical block within the flash memory in a prescribed search range as a prescribed physical block where management information is written, writes the management information necessary for accessing the flash memory to the prescribed physical block, and operates to search for the prescribed physical block when second firmware is read from the flash memory. The writing information, including the management information, is written to the prescribed physical block in a same format regardless of a type of flash memory. Information written to pages is sequentially read at prescribed page intervals in the prescribed search range in searching for the prescribed physical block.

6 Claims, 9 Drawing Sheets

MEMORY CONTROLLER FOR CONTROLLING MULTIPLE TYPES OF FLASH MEMORIES, AND MEMORY SYSTEM

BACKGROUND OF THE INVENTION

Field of the Invention

The present invention relates to a memory controller and a memory system.

Priority is claimed on Japanese Patent Application No. 2018-214940, filed Nov. 15, 2018, the content of which is incorporated herein by reference.

Description of Related Art

Research and development (R&D) on technology related to flash memories is being conducted.

Flash memories have a plurality of types (also referred to as types for convenience of description). For each type of flash memory, a memory controller suitable for the type is created and provided. At the time of activation, the memory controller reads management information stored in the flash memory by executing first firmware stored in a read-only memory (ROM). Thereby, second firmware stored in the flash memory is read and executed. At this time, when it is not possible to read the management information or the second firmware stored in the flash memory, the memory controller executes a prescribed recovery process. The recovery process may differ according to a cause of error. The recovery process is initialization as an example.

For example, in a flash memory storage system described in Patent Document 1, firmware for performing initialization when the flash memory is activated is written to a ROM provided in a memory controller that controls the flash memory. Here, the initialization in the present embodiment is a process of loading (storing) the second firmware read from the flash memory at the time of initialization of Patent Document 1 to the flash memory and the initialization at the time of activation in Patent Document 1 is different from the initialization in the present embodiment. Also, only a boot code is stored in the ROM in Patent Document 1 (see Patent Document 1).

PATENT DOCUMENTS

[Patent Document 1] Japanese Unexamined Patent Application, First Publication No. 2007-518166

SUMMARY OF THE INVENTION

However, conventionally, the versatility of a memory controller may deteriorate because a memory controller differing according to each type of a plurality of types of flash memories is created and provided.

The present invention has been made in consideration of such circumstances and an objective of the present invention is to provide a memory controller and a memory system capable of improving the versatility of a memory controller for controlling a plurality of types of flash memories.

According to an aspect of the present invention, there is provided a memory controller for controlling access to a flash memory including a plurality of physical blocks, each of which includes a plurality of pages, based on a command assigned from a host system, the memory controller including: a ROM to which first firmware is written; a RAM to which second firmware read from the flash memory is written; and a buffer configured to hold transmission and reception data to and from the host system or the flash memory, wherein the memory controller is configured to operate based on the first firmware or the second firmware, wherein the memory controller is configured to allocate any physical block within the flash memory in a prescribed search range to a prescribed physical block when management information is written, write the management information necessary for accessing the flash memory to the prescribed physical block, and operate to search for the prescribed physical block when the second firmware is read from the flash memory, wherein writing information including the management information is written to the prescribed physical block in a same format regardless of a type of flash memory, and wherein information written to pages is sequentially read at prescribed page intervals in the prescribed search range in searching for the prescribed physical block.

According to an aspect of the present invention, there is provided a memory system including a flash memory including a plurality of physical blocks, each of which includes a plurality of pages, and a memory controller configured to control access to the flash memory based on a command assigned from a host system, wherein the memory controller includes a ROM to which the first firmware is written; a RAM to which the second firmware read from the flash memory is written; and a buffer configured to hold transmission and reception data to and from the host system or the flash memory, wherein the memory controller is configured to operate based on the first firmware or the second firmware, wherein the memory controller is configured to allocate any physical block within the flash memory in a prescribed search range to a prescribed physical block when the management information is written, write the management information necessary for accessing the flash memory to the prescribed physical block, and operate to search for the prescribed physical block when the second firmware is read from the flash memory, wherein writing information including the management information is written to the prescribed physical block in a same format regardless of a type of flash memory, and wherein information written to pages is sequentially read at prescribed page intervals in the prescribed search range in searching for the prescribed physical block.

According to the present invention, it is possible to improve the versatility of a memory controller for controlling a plurality of types of flash memories.

DETAILED DESCRIPTION OF THE INVENTION

Embodiments

Hereinafter, embodiments of the present invention will be described with reference to the drawings.

<Configuration of Memory System>

Figure 1:
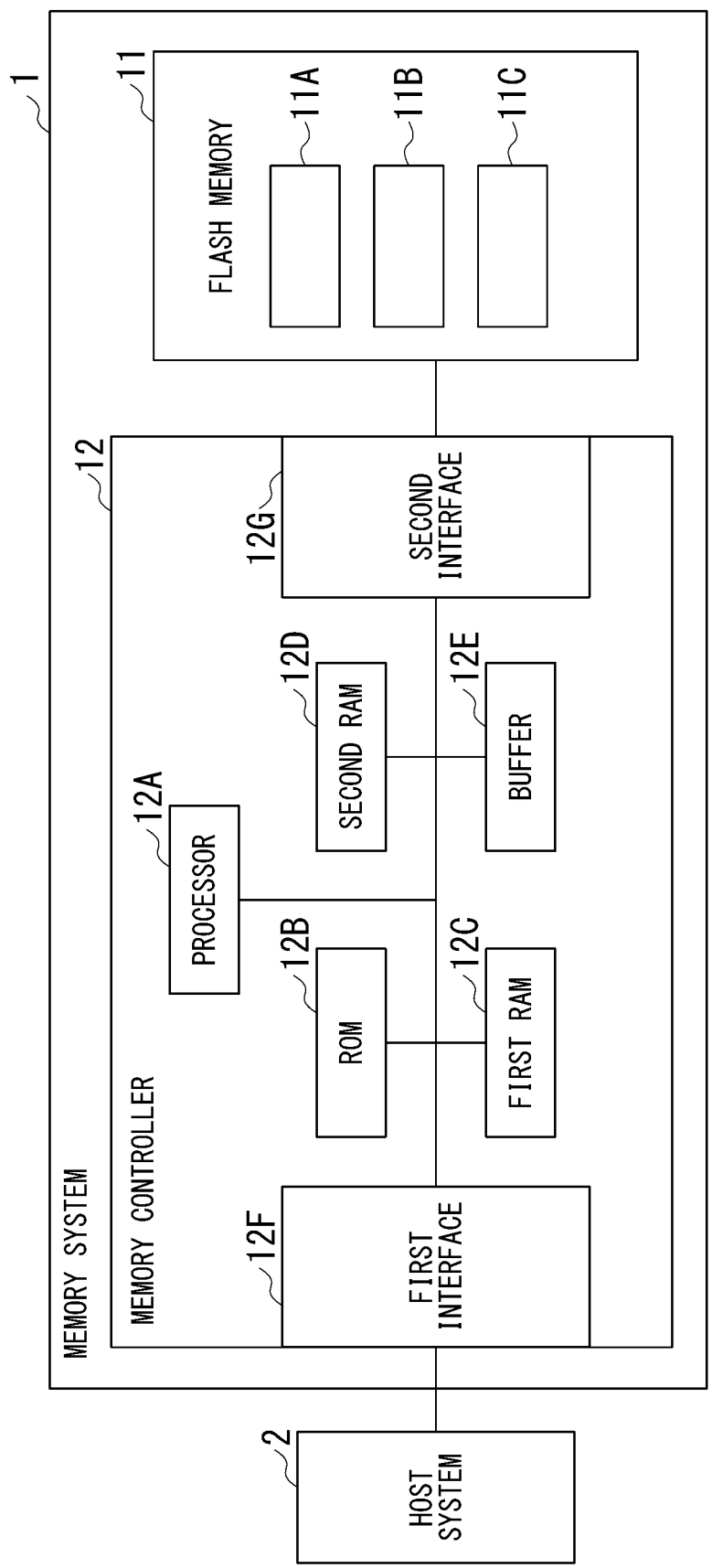
FIG. 1 is a diagram showing an example of a configuration of a memory system according to an embodiment.

FIG. 1 is a diagram showing an example of a configuration of a memory system 1 according to an embodiment.

The memory system 1 is connected to a host system 2.

The memory system 1 includes a flash memory 11 and a memory controller 12.

In the embodiment, software for searching for and reading second firmware is referred to as first firmware in the following description.

Also, in the embodiment, software for controlling access to the flash memory 11 is referred to as the second firmware in the following description.

Also, in the embodiment, software for initialization of the memory system 1 transmitted from the host system 2 to the memory system 1 is referred to as third firmware in the following description.

In initialization of the memory system 1, a process of generating regions such as a first region 11A, a second region 11B, and a third region 11C in the flash memory 11, storing necessary information in each region (for example, storing management information in the second region 11B), loading (storing) the second firmware to (in) the flash memory 11, and the like is performed.

The flash memory 11 may be one of various flash memories. For example, each cell included in the flash memory 11 may be a single-level cell (SLC), a multi-level cell (MLC), or a triple-level cell (TLC).

In the embodiment, an example in which the flash memory 11 is a NAND type of flash memory will be described.

In the flash memory 11, data is written and read in units of pages. Also, in the flash memory 11, data is erased in units of physical blocks (simply referred to as blocks in the embodiment).

The number of pages included in one physical block is a specified number. The specified number is of a plurality of types such as 32, 64, 128, and 256.

In this manner, the flash memory 11 is managed in units of physical blocks and units of pages.

The flash memory 11 is controlled by the memory controller 12. In the embodiment, at least some blocks of the plurality of blocks provided in the flash memory 11 are designated as any one of a first region 11A, a second region 11B, and a third region 11C by the memory controller 12.

Here, in the present embodiment, for convenience of description, a case in which respective regions (the first to third regions 11A to 11C) correspond to physical blocks of the flash memory 11 will be described.

Also, although three regions (the first to third regions 11A to 11C) are shown for convenience of description in the present embodiment, for example, other regions may be provided.

The first region 11A is a region of a physical block to which the second firmware is written by the memory controller 12 among a plurality of physical blocks provided in the flash memory 11.

When the second firmware is updated, for example, writing is performed after erasure of the entire second firmware of the destination block in which the second firmware is stored. Also, a part of the second firmware is not rewritten.

The second region 11B is a region of a physical block to which management information is written by the memory controller 12. The management information includes, for example, information such as information indicating a position of the first region 11A within the flash memory 11, information indicating a position of the third region 11C within the flash memory 11, information indicating a position of another region when the other region is located within the flash memory 11, information indicating a type of flash memory 11, and setting information of the memory system 1.

Here, the setting information of the memory system 1 may include, for example, one or more pieces of information indicating the number of flash memories 11 (referred to as the "number of chips" for convenience of description) provided in one memory system 1, command support information, and functional support information.

In the present embodiment, for convenience of description, a case in which the number of flash memories 11 connected to the memory controller 12 is one, i.e., a case in which the number of chips is one, is shown. Also, the number of chips may be two or more. In this case, the memory controller 12 assigns an instruction for each flash memory by asserting an enable signal for each of the plurality of flash memories. Also, the memory controller 12 may perform parallel control by assigning instructions to two or more flash memories substantially simultaneously using a plurality of channels.

Here, the information indicating the position within the flash memory 11 may be, for example, information about an address within the flash memory 11.

Also, the information indicating the type of flash memory 11 includes, for example, information indicating the number of physical blocks provided in the flash memory 11, information indicating the number of pages included in one block, information indicating the maximum number of bytes capable of being stored in one page, and the like. The maximum number of bytes capable of being stored in one page may be regarded as a magnitude of a page size. The page size represents the number of bytes per page. The page size is the number of bytes per page, and there are, for example, flash memories with page sizes such as 4 Kbytes, 8 Kbytes, and 16 Kbytes. Also, when the page size is 4 Kbytes, this is a nominal notation and the number of bytes of data capable of being actually stored is the number of bytes more than 4 Kbytes.

Also, the information indicating the type of flash memory 11 may include, for example, information indicating the order of connection when a plurality of flash memories 11 are connected and used. The information indicating the order may be, for example, a number (referred to as a "chip number" for convenience of description).

Also, the second region 11B includes at least information indicating a type of flash memory 11 and information indicating a position of the first region 11A within the flash memory 11 after initialization of the memory system 1.

The third region 11C is a region of a physical block to which user data received from the host system 2 is written by the memory controller 12.

Here, the memory controller 12 stores and manages information indicating a corresponding relationship between a logical address designated by the host system 2 and a physical address in the flash memory 11 in the storage unit. The storage unit may be, for example, a management block having management information within the flash memory 11.

Also, information for identifying a region in which data is written (referred to as region identification information for convenience of description) is written in data written to the first to third regions 11A to 11C. Therefore, a type of written data (a type such as management information or user data) can be identified by the region identification information. Also, the user data is data which is assigned from the host system 2 and written to the flash memory 11.

Here, although the first to third regions 11A to 11C are shown inside the flash memory 11 for convenience of description in FIG. 1, the first to third regions 11A to 11C are not located inside the flash memory 11 in a state in which the first to third regions 11A to 11C have not yet been generated inside the flash memory 11.

The memory controller 12 controls access to the flash memory 11 based on a command assigned from the host system 2.

The memory controller 12 includes a processor 12A, a ROM 12B, a first RAM 12C, a second RAM 12D, a buffer 12E, a first interface 12F, and a second interface 12G.

The processor 12A controls the entire memory system 1. The processor 12A is, for example, a central processing unit (CPU). Also, the processor 12A may be another processor such as a field-programmable gate array (FPGA) instead of the CPU.

In the present embodiment, a process to be performed in the memory controller 12 is executed by the processor 12A.

The ROM 12B is, for example, a mask ROM, and is a ROM to which the first firmware is written. The first firmware is referred to by the processor 12A when the memory controller 12 is required to read the second firmware stored in the flash memory 11. Then, the processor 12A reads the first firmware and performs a process based on the first firmware. The process based on the first firmware includes a process of reading the second firmware. Also, the memory controller 12 is required to read the second firmware stored in the flash memory 11 at the time when the processor 12A executes updated second firmware immediately after the host system 2 updates the second firmware or the like. However, an example in which the memory controller 12 is required to read the second firmware at the time of activation will be described in the present embodiment.

In the memory controller 12 of the present embodiment, the processor 12A controls access to the flash memory 11 based on the second firmware held in the RAM 12C. However, because the second firmware is not held in the RAM 12C at the time of activation, it is necessary to read the second firmware from the flash memory 11. Also, it is necessary to read the management information from the flash memory 11 in order to read the second firmware from the flash memory 11.

For example, in the present embodiment, a drive voltage is supplied to the memory controller 12 and a process at the time of activation is started at the timing when the processor 12A is operable normally. Specifically, the memory system 1 is connected to the host system 2 and therefore a drive voltage is supplied to the memory controller 12, and then the process at the time of activation is started.

The second RAM 12D is a RAM configured to hold the management information read from the second region 11B. Also, the management information is read from the second region 11B and written to the second RAM 12D under the control of the processor 12A.

Also, the second RAM 12D is used, for example, as a work region of the processor 12A.

The first RAM 12C is a RAM to which the second firmware read from the first region 11A is written by the processor 12A. Also, the first RAM 12C is a RAM to which the third firmware assigned from the host system 2 is written by the processor 12A.

In this manner, the first RAM 12C holds the second firmware and the third firmware executed by the processor 12A.

The buffer 12E holds data transmitted from the host system 2 and received by the memory controller 12. Also, the buffer 12E holds data to be transmitted from the memory controller 12 to the host system 2.

Also, the buffer 12E holds data read from the flash memory 11 by the memory controller 12. Also, the buffer 12E holds data to be written from the memory controller 12 to the flash memory 11.

In this manner, the buffer 12E is used for a data transfer between the memory controller 12 and the host system 2 and a data transfer between the memory controller 12 and the flash memory 11.

The first interface 12F is connected between the memory controller 12 and the host system 2 so that communication is possible. Also, the first interface 12F may be any interface capable of being connected between the memory controller 12 and the host system 2 so that communication is possible.

The second interface 12G is connected between the memory controller 12 and the flash memory 11. Also, the second interface 12G may be any interface capable of being connected between the memory controller 12 and the flash memory 11 so that communication is possible.

The host system 2 may be any device, and may be, for example, an industrial device operated by a prescribed operating system (OS) as in a workstation or the like. As another example, the host system 2 may be a household device such as a personal computer (PC) instead of the industrial device or a device such as a multifunctional portable phone terminal (a smartphone).

In the present embodiment, the memory system 1 writes user data received from the host system 2 to the flash memory 11 in response to a request from the host system 2. Also, in response to a request from the host system 2, the memory system 1 transmits user data corresponding to the request within the user data written to the flash memory 11 to the host system 2.

Also, the processor 12A reads first firmware stored in the ROM 12B and searches for second firmware written to the flash memory 11 based on the read first firmware. Then, when the processor 12A detects the second firmware written to the flash memory 11, the detected second firmware is read to the first RAM 12C and executed. Thereby, the processor 12A controls access to the flash memory 11 based on the second firmware.

On the other hand, information for issuing an error notification is transmitted to the host system 2 when the processor 12A has not detected the second firmware written to the flash memory 11 as a result of searching for the second firmware written to the flash memory 11 based on the first firmware. When the information is received, the host system 2 transmits the third firmware to the memory system 1. Then, the processor 12A executes the third firmware transmitted from the host system 2 and written to the first RAM 12C. Thereafter, the memory controller 12 executes initialization of the memory system 1 based on the third firmware according to the request of the host system 2.

Also, as another configuration, a configuration in which firmware (fourth firmware) for executing initialization of the memory system 1 similar to the third firmware is written to the ROM 12B may be used in the memory system 1. In this configuration, when the second firmware written to the flash memory 11 has not been detected as a result of searching for the second firmware written to the flash memory 11 based on the first firmware, the processor 12A executes initialization of the memory system 1 by executing the fourth firmware written to the ROM 12B according to the request of the host system 2.

Here, when the second firmware written to the flash memory 11 is searched for based on the first firmware, the memory controller 12 first detects the second region 11B of the flash memory 11 and reads the management information. Thus, when the second region 11B is not generated in the flash memory 11 or when the management information is not read due to another cause, an error occurs. When the second region 11B is not generated in the flash memory 11, the memory system 1 is initialized according to the request of the host system 2. A recovery method when the management information is not read due to another cause depends on the host system 2.

In the initialization of the memory system 1, the memory controller 12 generates the first to third regions 11A to 11C in the flash memory 11, for example, from a state in which the first to third regions 11A to 11C have not been generated in the flash memory 11. Also, in the initialization of the memory system 1, the memory controller 12 executes, for example, a process of writing the management information to the second region 11B, and then writing the second firmware transmitted from the host system 2 to the first region 11A.

Also, even if the memory controller 12 has read the management information, an error occurs when the second firmware is broken.

The recovery method when the firmware saved in the flash memory 11 is not read normally depends on the host system 2.

Also, for example, the memory system 1 is initialized when the memory system 1 is shipped from the factory or initialized by a user who uses the memory system 1 or the like after shipment of the memory system 1.

When the second firmware is updated according to the request of the host system 2, the memory controller 12 saves the second firmware received from the host system 2 in the flash memory 11 and then executes the saved second firmware. Thus, the processor 12A refers to the ROM 12B, reads the first firmware, performs a process based on the first firmware, reads the saved second firmware from the flash memory 11 to write the read second firmware to the first RAM 12C, refers to the first RAM 12C, and executes the updated second firmware.

At this time, a recovery method when the second firmware saved in the flash memory 11 is not read normally depends on the host system 2.

<Structure of Flash Memory>

Figure 2:
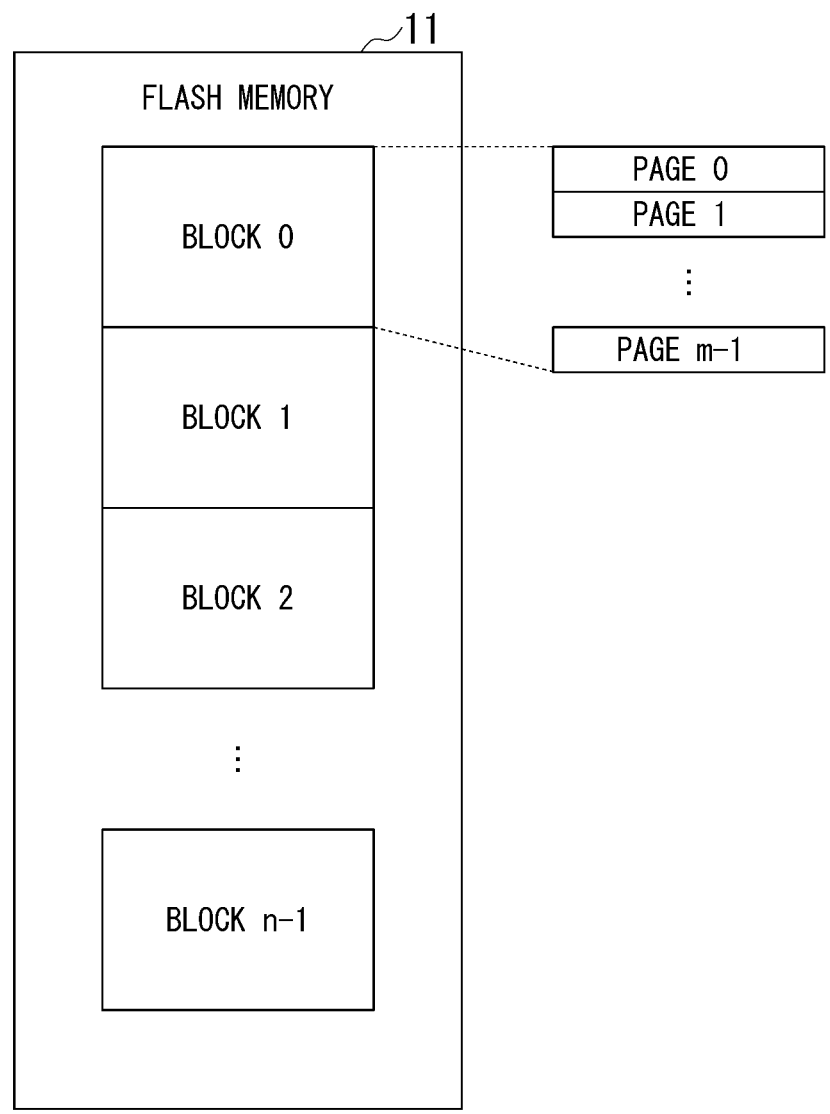
FIG. 2 is a diagram showing an example of configurations of blocks and pages of a flash memory according to the embodiment.

FIG. 2 is a diagram showing an example of configurations of blocks and pages of the flash memory 11 according to the embodiment.

The flash memory 11 has a plurality of n (n is an integer of 2 or more) blocks. In the present embodiment, for convenience of description, n blocks are referred to as blocks 0 to n−1.

Each of the blocks 0 to n−1 has m (m is an integer of 2 or more) pages. In the present embodiment, for convenience of description, the m pages will be described as pages 0 to m−1.

The blocks 0 to n−1 are units of erasure and the pages 0 to m−1 are units of reading/writing. The page size is the number of bytes in one page.

Figure 3:
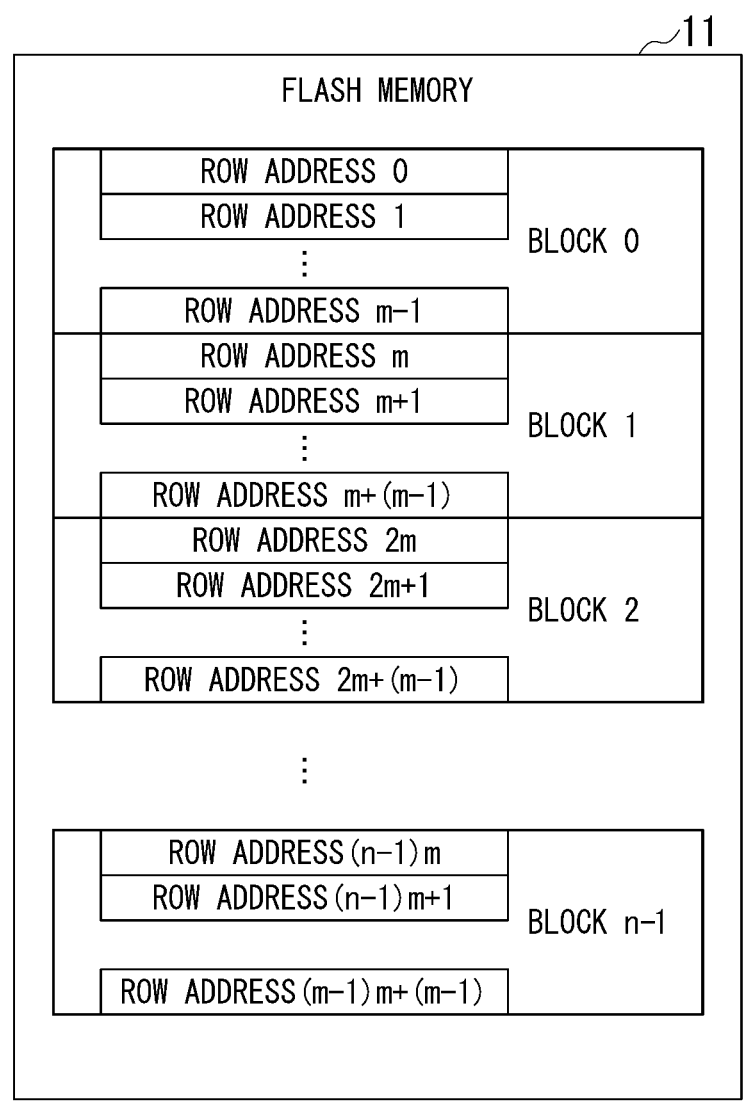
FIG. 3 is a diagram showing an example of a configuration of addresses of the flash memory according to the embodiment.

FIG. 3 is a diagram showing an example of a configuration of addresses of the flash memory 11 according to the embodiment.

FIG. 3 shows row addresses. In the present example, a case in which the designation of the row address is represented by 2 bytes is shown. The row address is filled with a page number on the lower-order side and a block number subsequent thereto (without a gap of 1 bit). The remaining higher-order bits are not determined by the flash memory 11 and are normally set to a "0" value.

Here, a page of the flash memory 11 in which the number of pages per block is 64, 128, or 256 to be designated by the row address when the row address is designated by "0000 0000 1000 0000" in binary will be described. First, in the flash memory 11 in which the number of pages per block is 64, the row address designates a page of page number 0 within the physical block of block number 2. In the flash memory 11 in which the number of pages per block is 128, the row address designates a page of page number 0 within the physical block of block number 1. In the flash memory 11 in which the number of pages per block is 256, the row address designates the page of page number 128 within the physical block of block number 0.

A column address of one page is set to 0 to z−1 in units of bytes. The page size is z bytes.

The address has 2 bytes in the page size of up to 64 Kbytes.

In the flash memory 11, the address is designated by, for example, a combination of a row address of 3 higher-order bytes and a column address of 2 lower-order bytes.

In the flash memory 11 used in the present embodiment, for example, a read protocol is specified and the memory controller 12 corresponds to the protocol. In the protocol, for example, a first command, a read start address, and a second command are sequentially transmitted to the flash memory 11, a busy signal of the flash memory 11 being negated is waited for, and data is read from the flash memory 11.

In the flash memory 11 used in the present embodiment, for example, a range in which page addresses (row addresses) are continuous is specified and the memory controller 12 corresponds to the range. The range is cut off halfway, for example, when the number of blocks is not a power of 2.

In the present embodiment, the number of pages per block is a power of 2.

<Page Format>

In the present embodiment, the format within one page is determined to be a page format with respect to each of the management information and the user data.

Each page includes, for example, BI, which is block information, an error-correcting code (ECC), and data.

In the page format, for example, a position and a size are specified with respect to the BI, the ECC, and the data.

Also, in the page format, the page size is arbitrary.

Also, the data is managed by the host system 2 in units of sectors and the number of bytes in units of sectors may be any number of bytes. The sector unit is 512 bytes.

It is easy to manage the user data region when the number of sectors in one page is a power of 2 with respect to the user data region.

Figure 4:
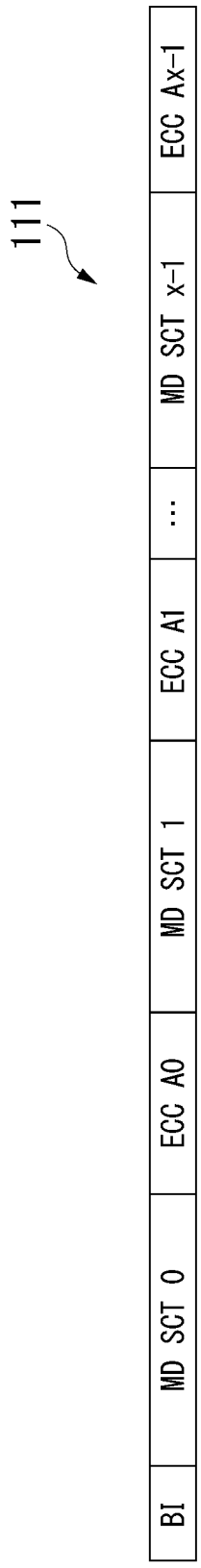
FIG. 4 is a diagram showing an example of a page format of management information according to the embodiment.

FIG. 4 is a view showing an example of a page format 111 of the management information according to the embodiment. The management information includes block information BI, $0^{th}$ to $x-1^{th}$ ($x-1$ is an integer of 1 or more in the embodiment) data, and $0^{th}$ to $x-1^{th}$ ECCs.

These are arranged in the order of the BI, the $0^{th}$ data, the $0^{th}$ ECC, the first data, the first ECC, . . . , the $x-1^{th}$ data, and the $x-1^{th}$ ECC.

Here, in FIG. 4 and the present embodiment, for convenience of description, the $i^{th}$ (i is an integer of 0 to $x-1$) data is denoted by "MD SCT i" and the $i^{th}$ ECC is denoted by "ECC Ai".

In the present embodiment, for any value of i, the length (the number of bytes) of data i is the same, and the length of ECC i is the same.

Here, at the beginning of the management information, ECC 0 is attached immediately after a portion of a sequence of BI and data 0. That is, an error of a portion of BI and data 0 is corrected by ECC 0.

Also, the ECC i is attached immediately after data i for i=1 to $x-1$. That is, an error of the data i is corrected by the ECC i.

The "MD SCT i" represents the $i^{th}$ sector in the management information.

The "ECC Ai" is ECC data arranged immediately after the "MD SCT i".

Figure 5:
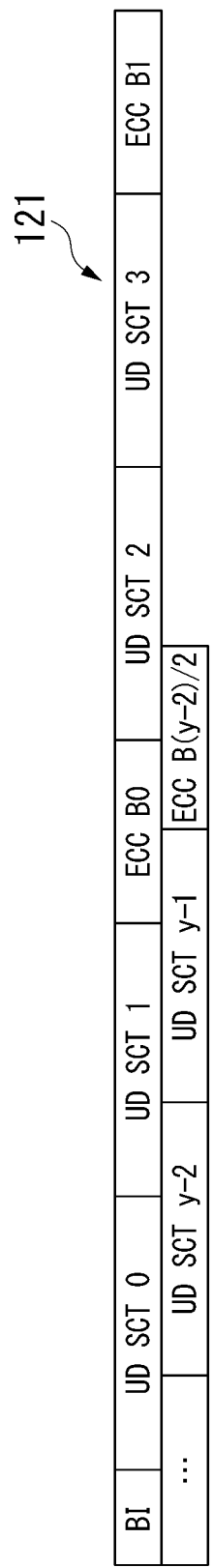
FIG. 5 is a diagram showing an example of a page format of user data according to the embodiment.

FIG. 5 is a diagram showing an example of a page format 121 of user data according to the present embodiment.

Page data includes BI which is block information, $0^{th}$ to $y-1$ ($y-1$ is an integer greater than or equal to 1 in the embodiment) data, and $0^{th}$ to $(y-2)/2^{th}$ ECCs.

These are arranged in the order of the BI, the $0^{th}$ data, the first data, the $0^{th}$ ECC, the second data, the third data, the first ECC, . . . , the $y-2^{th}$ data, the $y-1^{th}$ data, and the $(y-2)/2^{th}$ ECC.

Here, in FIG. 5 and the present embodiment, for convenience of description, the $j^{th}$ (j is an integer of 0 to $y-1$) data is denoted by "UD SCT j" and a $k^{th}$ (k is an integer of 0 to $(y-2)/2$) ECC is denoted by "ECC Bk".

In the present embodiment, a length of data j (the number of bytes thereof) is the same for any value of j. In the present embodiment, the length of ECC k is the same for any value of k.

The "UD SCT j" denotes a $j^{th}$ sector saved in a corresponding page of user data.

The "ECC Bk" is ECC data arranged immediately after "MD SCT 2k+1".

Because the management information is information necessary for constructing the memory system 1, the memory system 1 does not operate unless the management information can be read. Thus, a higher correction capability is required for the management information.

Because the data capacity stored in the flash memory 11 is reduced when the number of sectors within a page of the flash memory 11 is reduced, it is necessary to set the number of sectors within a specified page of the flash memory 11 with an ECC having a correction capability that is not lower than that required for the flash memory 11 in the user data. For example, if the page size of the flash memory 11 is 8 Kbytes, 16 sectors are required for one page.

On the other hand, because the management information has a smaller number of sectors than user data, for example, three sectors, the number of bytes of the ECC itself can be increased. As for the ECC, if a correction scheme is the same, the number of correctable bits increases when the number of bytes of the ECC itself increases. Also, because the management information can be allocated one ECC for a small number of bytes of data, the ECC correction capability of the management information can be higher than the ECC correction capability of the user data.

As a specific example, a configuration in which an ECC is attached to information of 512 bytes or the like in the page format 111 of the management information and an ECC is attached to information of 1024 bytes or the like in the page format 121 of the user data may be used. Also, when an ECC is attached to data including BI, the number of bytes corresponding to the ECC is increased by an amount of BI.

In this case, even if ECCs having the same number of correction bits are set for the management information and the user data, the management information with a smaller amount of data to be subjected to error correction has a higher correction capability.

Therefore, the maximum ECC correction capability supported by the memory controller 12 is used in the management information.

The correction capability of the ECC of the user data may differ according to each flash memory 11. Also, the page size may differ according to each flash memory 11.

For the user data, for example, one ECC may be provided for each sector when a specified number of sectors can be accommodated within one page even if an ECC having the required correction capacity or more is secured.

The page format of the region in which the second firmware is saved may be the same as either a page format 111 shown in FIG. 4 or a page format 121 shown in FIG. 5, or may be another page format.

Also, a page format of a region in which data of a table is saved may be the same as either the page format 111 shown in FIG. 4 or the page format 121 shown in FIG. 5 or may be another page format. The data of the table is data other than the management information and the user data and represents a corresponding relationship between a logical address and a physical address of the user data.

In the other page format, for example, a value of x, a value of y, the correction capability of the ECC, or the like may be different.

The host system 2 manages data in units of logical sectors. Thus, all data within the flash memory 11 that is controlled by the host system 2 are unified to be managed in units of physical sectors. The number of bytes of one sector is, for example, 512 bytes.

The page format 121 of the user data is calculated based on the required ECC correction capability and page size. For example, the number of physical sectors is 16 for a flash memory having a page size of 8 Kbytes.

In the present embodiment, the page format 111 of the management information is the same regardless of the type of the flash memory 11. Furthermore, in the present embodiment, the management information is configured to be able to be set in a smallest page size within all supported types of flash memories for the flash memory 11.

Also, although a case in which the page format 111 of the management information and the page format 121 of the user data are different is shown in the present embodiment, the same configuration may be used between the page format 111 of the management information and the page format 121 of the user data as another example of the configuration.

As an example, when a page format of other data such as user data (the page format 121 or the like) is different from the page format 111 of the management information, the memory controller 12 can determine whether or not each page includes the management information based on whether or not the page format of each page present in the flash memory 11 matches the page format 111 of the management information. That is, the memory controller 12 determines that the page includes the management information when the page format of the page present in the flash memory 11 matches the page format 111 of the management information and determines that the page does not include the management information when the page format of the page present in the flash memory 11 does not match the page format 111 of the management information. Here, a method of determining whether or not a certain page format is a prescribed page format is not particularly limited. As an example, a method of determining that a certain page format is a prescribed page format if it is determined that an error has been corrected normally when error correction has been performed using an ECC by regarding that the certain page format is the prescribed page format may be used. As another example, when it is determined that information for identifying a certain page format matches information for identifying a prescribed page format, a method of determining that the certain page format is the prescribed page format may be used.

Here, an example of updating the management information is shown. The management information is written to the management block. The memory controller 12 writes the management information when the management information is updated or when an error condition specified for the read management information is satisfied.

For example, if there is a page after a page to which currently valid management information of the management block is written, the management information is written to the page.

For example, if there is no page after the page to which the currently valid management information of the management block is written, the management information is written to a reserved block.

For example, when the block in which the second firmware is saved becomes unusable due to a writing error or the like, the memory controller 12 may write the second firmware to a new block. In this case, the memory controller 12 writes the management information to the reserved block.

Therefore, in the management information of any page of the management block, the address information of the block in which the second firmware is saved is the same. Also, other information (such as a type of flash memory) necessary for reading the second firmware is not changed halfway after setting in the initialization of the memory system 1. Thus, the second firmware can be read even if the management information of any page is read in the currently valid management block. That is, irrespective of the page for the management information read in one management block, information necessary to read the second firmware is the same. This is because searching for the management information is not a process of searching all pages of all management blocks therefor and a search may not be possible if the address information of the block saving the second firmware is changed in a halfway page of the management block. It is possible to acquire information necessary for reading the second firmware if the management information written to the currently valid management block is searched for.

The reserved block is a block which is generated together with the management block in the initialization of the memory system 1 and is usable as a management block. If writing to the currently valid management block is not possible when writing to the management block, the management information is written to a first page of the reserved block. Thereby, a reserved block to which the management information is written becomes the currently valid management block and a previous management block becomes a reserved block. Erasure is not performed in the previous management block. In the reserved block, erasure is performed when data is written to the first page.

Because the data is erased before the data is written to the first page of the block, a power supply interruption before erasure is not problematic. When the memory controller 12 cannot read the management information from the currently valid management block, the erasure of the reserved block is performed before writing so that the management information of the reserved block is read.

The block of the flash memory 11 cannot be used when a writing error or an erasure error occurs.

Here, an example in which a plurality of pieces of the management information are detected is shown.

For example, the memory controller 12 may generate a copy block to duplicate data. In this case, although two pieces of the same management information are detected, the memory controller 12 may read any data because data of the copy block is the same as data of a copy-source block.

For example, when the management information is written to the first page of the reserved block, different management information is detected because data of the previous management block is not erased.

For example, when the management information is searched for, different management information is detected if there is management information in any page because page 0 and page 64 are detected with respect to the same block in a case in which the number of pages per block is 128 and a value of a page search interval is 64.

In this regard, in a block having a large number of pages, the number of pages to be written is limited without writing up to the last page. That is, if a range in which the management information is written is set to the number of pages of the block having the minimum number of pages, there is no management information due to an erased state even if a halfway page of a block having a large number of pages is searched for.

The memory controller 12 selects four blocks as a management block in the initialization of the memory system 1 and writes information in pairs, each of which includes two blocks. Even if these blocks become unusable, the memory controller 12 does not add new blocks. A range in which the memory controller 12 selects the management block is a range in which a search is possible at the time of activation or the like.

Thus, the memory controller 12 writes, for example, information to be incremented every time the management information is written to each management block. The information may be, for example, a number such as 1, 2, or 3 (for convenience of description, referred to as an update number). In this case, the management information having a largest update number within the management information which has been searched for indicates that it is present in the currently valid management block. That is, the management information having the largest update number within the management information which has been searched for has the same information as the information necessary to read the second firmware of the currently valid management information. Thereby, even when a plurality of pieces of the management information are present within the flash memory 11, the memory controller 12 can acquire information necessary to read the second firmware having the currently valid management information. Also, if there is a copy block due to duplication, the same update number is written to a copy block and a copy-source block.

The management information is updated in units of pages because the management information is one piece of data in a unit of a page. Thus, the update number is necessarily written for each page.

<BI, ECC, and Data>

BI includes information about data of a page including the BI. In the BI, for example, region identification information is included as minimum information. Furthermore, it is preferable that the BI include an update number. The number of bytes of the BI is specified, for example, for each memory controller 12.

Also, although a case in which the BI is arranged at the beginning of the block (the beginning of the page) is shown in the examples of FIGS. 4 and 5, the BI may be arranged at another position within the block (at another position within the page). For example, the BI may be arranged immediately after data 0 or may be arranged at any position after ECC 0.

At the time of searching, the management information to be read does not have to be the information of all the sectors, and may be only the information of the sector and the BI that are information necessary to read the second firmware. It is only necessary to include information necessary to read the second firmware in an ECC sector together with the BI. Furthermore, here, it is more preferable that region identification information and an update number be present. Also, the BI itself may not be present and data of the sector may include the region identification information and the update number.

The ECC is information for performing error correction on the BI and the data. The number of ECC bytes differs according to a correction capability. In the example of FIG. 1, for example, the correction capability of the ECC may differ according to each of the first to third regions 11A to 11C or the correction capability of the ECC may be the same with respect to two or more of the first to third regions 11A to 11C.

Although an error bit position is ascertained with respect to an error of 8 bits or less and error correction is performed normally in an ECC with an 8-bit correction capability as a specific example, it is not possible to perform error correction normally with respect to an error of 9 bits or more.

The memory controller 12 corrects read data according to a result of ECC decoding or notifies that correction is not possible. Also, if an ECC decoder is created to notify that correction is not possible when an erased state (a value of all 1's) is read, it is possible to determine that information is not managed information when the page in the erased state is read in the searching for the management information.

The memory controller 12 has a function of using a plurality of ECCs because there are a plurality of supported types of flash memories for the flash memory 11, and different correction capabilities are required according to types of flash memories.

Because the BI has a smaller number of bytes than sector data, an ECC is allocated together with adjacent sector data. As another example, an ECC may be independently attached to the BI. In this case, it is necessary to create an ECC circuit for the BI, and an ECC region for the BI is required in a page.

In the present embodiment, data saved in each of the first to third regions 11A to 11C includes region identification information which is information for identifying the type of data.

The region identification information may be included, for example, in the BI, the data, or both thereof, in the page formats 111 and 121.

Also, for example, the region identification information may be separate from the management information, or may be integrated with the management information, with respect to the second region 11B.

Here, the region identification information for identifying the type of data indicates the type of data written in each region.

For example, the region identification information for identifying management information identifies that the written data is the management information. Also, the type of written data is similarly identified with respect to the region identification information of data other than the management information.

<Management Block>

The management block is a block for writing the management information and the management information is written to the management block in a unit of one page. For example, region identification information and an update number of the management information are simultaneously written.

For example, although the management information is initially written to page 0 in the management block, new management information is written to page 1 when details of the management information are updated. Likewise, the new management information is written to page 2 after page 1. The same is true for the subsequent pages.

The management information is mainly updated when details of the management information are updated. Also, as a recovery process, the management information is updated when the read data of the management information satisfies a prescribed error condition.

Here, an update count in the management block may be specified arbitrarily. The update count may be, for example, the number of times from the first page to the last page of the management block, or may be the number of times up to a prescribed page number regardless of the number of pages included in the management block.

For the management block, for example, a copy management block is provided. Thereby, there are two management blocks having the same details. Furthermore, two reserved management blocks are provided. In this case, four blocks identified as management blocks are present in the flash memory 11.

A state in which these four management blocks exist is an initial state, for example, a state of a maximum number. Although the number of such management blocks may be theoretically increased, a region for storing user data decreases as the number increases.

In the reserved block, invalid information is written, specifically, the information is erased or old management information is present.

<Plurality of Types of Flash Memories>

In the embodiment, three different types of flash memories 211, 311, and 411 shown in FIGS. 6 to 8 will be described as an example.

Sizes of blocks generated in the regions of the flash memories 211, 311, and 411 are different in the different types of flash memories 211, 311, and 411. In the examples of FIGS. 6 to 8, an example in which the number of pages included in one block is different will be described as a case in which the block sizes are different.

Also, for the flash memories 211, 311, and 411, an interface for a read instruction and at least the addressing of the row address is the same and a protocol for reading data is the same. That is, they can be read in the same method as viewed from the memory controller 12.

Also, data with different signals that are used cannot be read. However, even if a terminal position of the flash memory 11 is different, data can be read as long as a connection with the memory controller 12 is possible.

Figure 6:
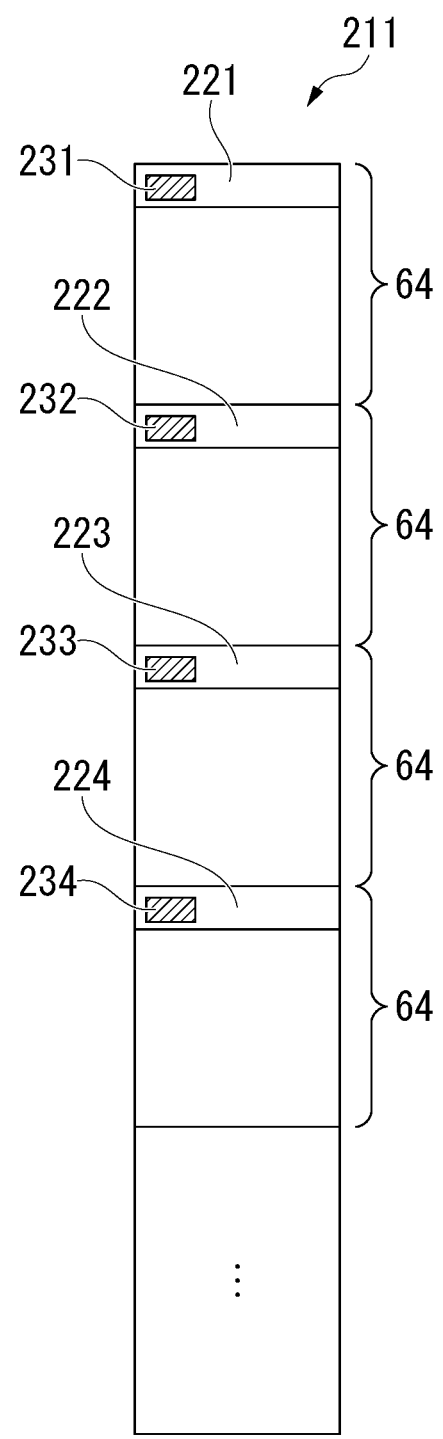
FIG. 6 is a diagram showing an example of a region of a first type of flash memory according to the embodiment.

FIG. 6 is a diagram showing an example of a region of a first type of flash memory 211 according to the embodiment.

Figure 7:
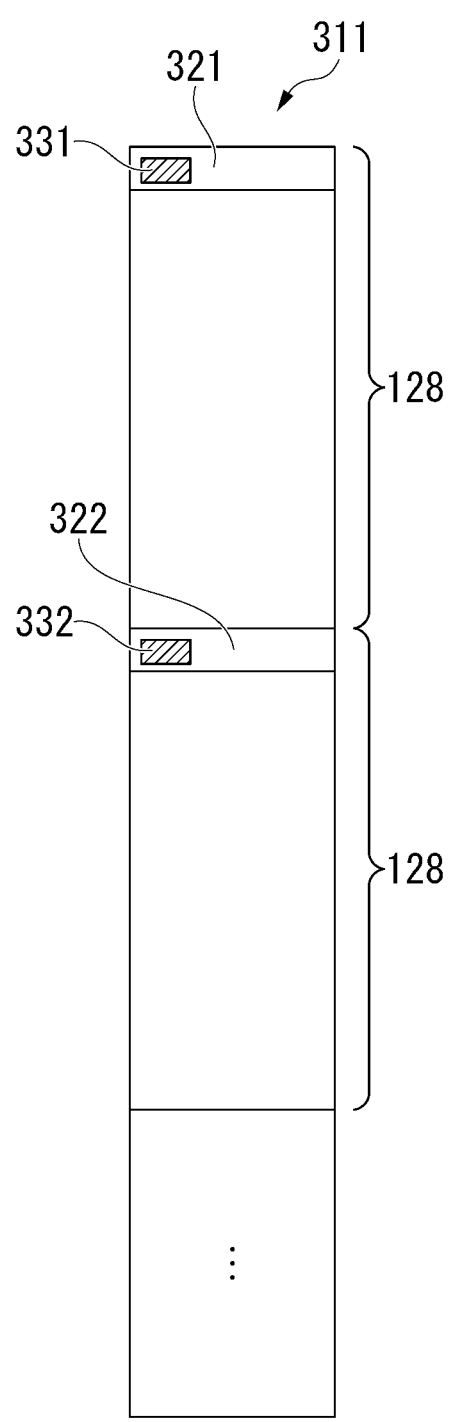
FIG. 7 is a diagram showing an example of a region of a second type of flash memory according to the embodiment.

FIG. 7 is a view showing an example of a region of a second type of flash memory 311 according to the embodiment.

Figure 8:
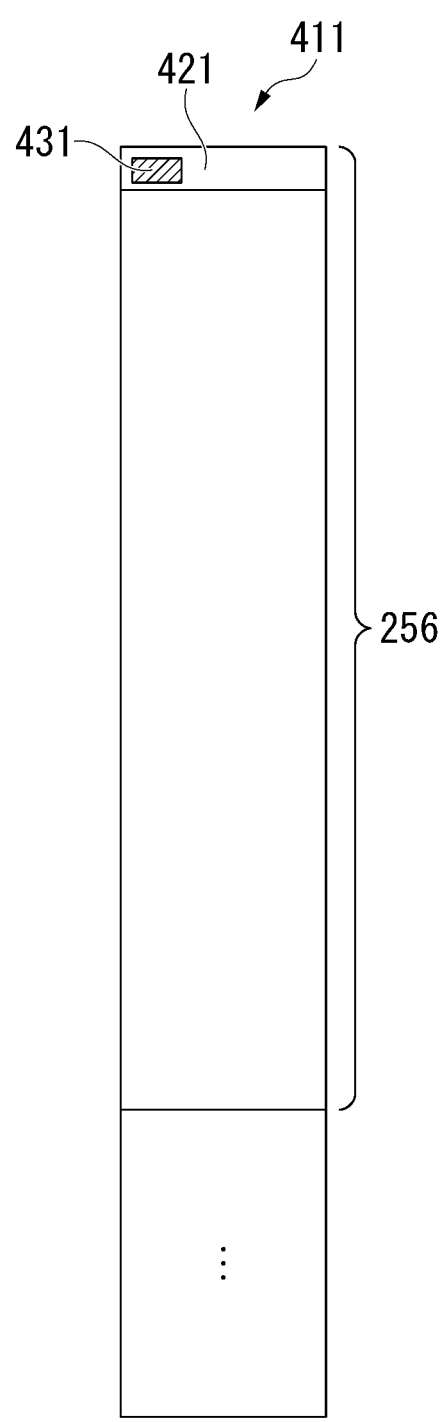
FIG. 8 is a diagram showing an example of a region of a third type of flash memory according to the embodiment.

FIG. 8 is a diagram showing an example of a region of a third type of flash memory 411 according to the embodiment.

Here, in the examples of FIGS. 6 to 8, the number of pages included in one block is different in the first type of flash memory 211, the second type of flash memory 311, and the third type of flash memory 411.

Specifically, in the first type of flash memory 211 shown in FIG. 6, a plurality of blocks having the same size are generated and 64 pages are included in one block. Also, in the second type of flash memory 311 shown in FIG. 7, a plurality of blocks having the same size are generated and one block includes 128 pages. Also, in the third type of flash memory 411 shown in FIG. 8, a plurality of blocks having the same size are generated and one block includes 256 pages.

In the present embodiment, in terms of the page format 111 of the management information, the same page format is used in the first type of flash memory 211, the second type of flash memory 311, and the third type of flash memory 411.

Also, in terms of page formats of user data and the like other than the management information, for example, the same page format or different page formats may be used in the first type of flash memory 211, the second type of flash memory 311, and the third type of flash memory 411.

In the first type of flash memory 211 shown in FIG. 6, 64 pages from the beginning constitute a first block and 64 pages subsequent thereto constitute a second block. The same is true for subsequent blocks.

In the data saved in each block, region identification information for identifying one of the first to third regions 11A to 11C in which the data is saved is written.

In the present embodiment, in all the first to third regions 11A to 11C, a case in which region identification information 231 to 234 is arranged at the same position of first pages 221 to 224 in the blocks and pages subsequent thereto is shown.

Also, the region identification information may not be present because other data cannot be read when the data format is different. On the other hand, if the data format is the same, the region identification information is arranged at the same position to perform checking in the region identification information.

Also, in the flash memory 211, one or more blocks among the plurality of blocks are allocated as the second region 11B and the region identification information is written at a fixed position in the second region 11B. In the present embodiment, the second region 11B is one management block. Also, although four management blocks may be present in the flash memory 211, one currently valid management block is shown in the description of the present example.

In the second type of flash memory 311 shown in FIG. 7, 128 pages from the beginning constitute a first block and 128 pages subsequent thereto constitute a second block. The same is true for subsequent pages.

In the data saved in each block, region identification information for identifying one of the first to third regions 11A to 11C in which the data is saved is written.

In the present embodiment, in all the first to third regions 11A to 11C, a case in which region identification information 331 and 332 is arranged at the same position of first pages 321 and 322 in the blocks and pages subsequent thereto is shown.

Also, the region identification information may not be present because other data cannot be read when the data format is different. On the other hand, if the data format is the same, the region identification information is arranged at the same position to perform checking in the region identification information.

Also, in the flash memory 311, one or more blocks among the plurality of blocks are allocated as the second region 11B and the region identification information is written at a fixed position in the second region 11B. In the present embodiment, the second region 11B is one management block. Also, although four management blocks may be present in the flash memory 311, one currently valid management block is shown in the description of the present example.

In the third type of flash memory 411 shown in FIG. 8, 256 pages from the beginning constitute a first block and 256 pages subsequent thereto constitute a second block. The same is true for subsequent pages.

In the data saved in each block, information for identifying one of the first to third regions 11A to 11C in which the data is saved (region identification information) is written.

In the present embodiment, in all the first to third regions 11A to 11C, a case in which region identification information 431 is arranged at the same position of first pages 421 in the blocks and pages subsequent thereto is shown.

Also, the region identification information may not be present because other data is not read when the data format is different. On the other hand, if the data format is the same, the region identification information is arranged at the same position to perform checking in the region identification information.

Also, in the flash memory 411, one or more blocks among the plurality of blocks are allocated as the second region 11B and the region identification information is written at a fixed position in the second region 11B. In the present embodiment, the second region 11B is one management block. Also, although four management blocks may be present in the flash memory 411, one currently valid management block is shown in the description of the present example.

As in the examples of FIGS. 6 to 8, region identification information is also arranged in pages other than the first page of each block. Thereby, even when a halfway page other than the first page is searched for by the memory controller 12, the region can be identified. This is effective, for example, when the memory controller 12 cannot read the first page but can read a halfway page.

As in the examples of FIGS. 6 to 8, management information is written to one flash memory 11 (the flash memory 211, 311, or 411 in the examples of FIGS. 6 to 8). The order of regions for accessing the flash memory 11 is determined by the memory controller 12. In the present embodiment, a management block is allocated to the region to be first accessed. Although the memory controller 12 first accesses a block of the first region, a search is performed in all search ranges because even if the management information is present in the block of the first region, the management information is not always the latest management information within management information for searching for information thereof.

Here, an example of a method of setting the search range is shown.

In all the blocks searched for in all supported types of flash memories 11, at least a start row address and a page interval for reading page 0 are determined. The page interval is the greatest common divisor of the number of pages per block in all the supported types of flash memories 11.

A search start point is a row address that becomes page 0 of any block in all the supported types of flash memories 11. The process is simple when the search is started from row address 0 (page 0 of block 0).

A search count is determined by the number of blocks in the flash memory 11 having the largest number of pages per block among all the supported types of flash memories 11. If the search count is too small, a specified number is not satisfied when a management block is generated in the initialization of the memory system 1 in the flash memory 11 having the largest number of pages per block among all the supported types of flash memories 11. Also, if the search count is too large, the search time will be long.

For example, if a search starts from block 1 in the flash memory 11 having 64 pages per block when 64 pages, 128 pages, and 256 pages per block are supported, an ineffective search starts from page 64 of block 0 in the flash memory 11 having 128 pages or 256 pages per block.

All pages to be searched for have addresses actually present in all the supported types of flash memories 11.

For example, assuming that the flash memory 11 having 64 pages per block includes 1024 blocks within one chip (block numbers 0 to 1023) and one block to be searched for in the flash memory 11 having 256 pages per block is block 256 when 64 pages, 128 pages, and 256 pages per block are supported, an ineffective search for a block which is block 1024 and is not present is performed in the flash memory 11 having 64 pages per block.

Also, the search order can be the order, for example, from the larger row address to the smaller row address.

Also, the searching for the region of the flash memory 11 may be performed, for example, in a unit of each error correction range with one ECC of the flash memory 11.

Also, when there are a prescribed number of sectors in each page, for example, the search may be performed only in a range in which error correction is performed with one ECC including a sector for which information of a search target is determined to be written. If all search target information is configured to be included in the sector, the reading time of the information becomes short. This sector may be any sector, for example, a first sector of each page. Also, the number of sectors included in one page may be any number, for example, three.

If the memory controller 12 can detect the management information at the time of searching for management information, it is not necessary to read all information present in the region of the flash memory 11. For example, it is only necessary to read information necessary for reading the second firmware from the flash memory 11.

As an example, when a page format 111 of a management block shown in FIG. 4 is used, the memory controller 12 may read a region portion of BI located at the beginning, data 0, and ECC 0 and determine whether or not target data is the management information by determining whether or not the error correction can be performed normally.

<Installation of Plurality of Flash Memories>

In the present embodiment, one memory system 1 may include a plurality of flash memories 11.

For example, when the memory system 1 includes L (L is an integer of 2 or more) flash memories, different chip information is set in each of the L flash memories 11. For example, a chip number is used as the chip information. In the present example, the chip numbers are, for example, 0, 1, 2, . . . , (L−1). The maximum number of flash memories included in one memory system 1 may be any number, for example, 16.

When a plurality of flash memories 11 are provided, the memory controller 12 identifies each flash memory 11 by the chip number of each flash memory 11 and controls access to each flash memory 11.

In this manner, when a plurality of flash memories 11 are provided in one memory system 1, for example, the memory controller 12 sets one or more flash memories 11 in which the management information is set as a search target. The one or more flash memories 11 in which the management information is set as a search target may be, for example, some flash memories 11 or all the flash memories 11.

The number of sectors to be read at the time of searching is the same regardless of the number of chips.

Here, although a type of flash memory 11 connected to the memory controller 12 is unknown at the time of searching for the management information, a method of performing a search from the flash memory with chip number 0 all the time by necessarily establishing a connection of the flash memory 11 with chip number 0 is reliable and easy because the number of connected chips is also unknown. Also, because the memory controller 12 can check a chip number to which the flash memory 11 is connected, the process may end due to an error, for example, when it is determined that the flash memory 11 with chip number 0 is not connected.

As another example, the memory controller 12 can search the flash memories 11 for a plurality of chip numbers in a short time by performing reading from the flash memories 11 in parallel with respect to the plurality of chip numbers.

<Writing of Management Information and Region Identification Information>

When data is written to the flash memory 11, the memory controller 12 necessarily writes region identification information.

In the present embodiment, when the memory controller 12 reads the region identification information from the flash memory 11, information for a prescribed region portion is referred to in units of a prescribed number of pages and it is determined whether or not there is region identification information.

In the examples of FIGS. 6 to 8, when the memory controller 12 reads the region identification information from the flash memory 11, it is determined whether or not there is region identification information in units of 64 pages from the beginning of the region of the flash memory 11.

In this case, in any type of flash memory 11 (the flash memory 211, 311, or 411) shown in FIGS. 6 to 8, the region identification information is arranged at the same position within the units of 64 pages from the beginning of the region of flash memory 11. When a search is performed in units of 64 pages, the region identification information is present at the same position.

Also, the management information is similar to the region identification information.

<Procedure of Process of Reading Management Information>

Figure 9:
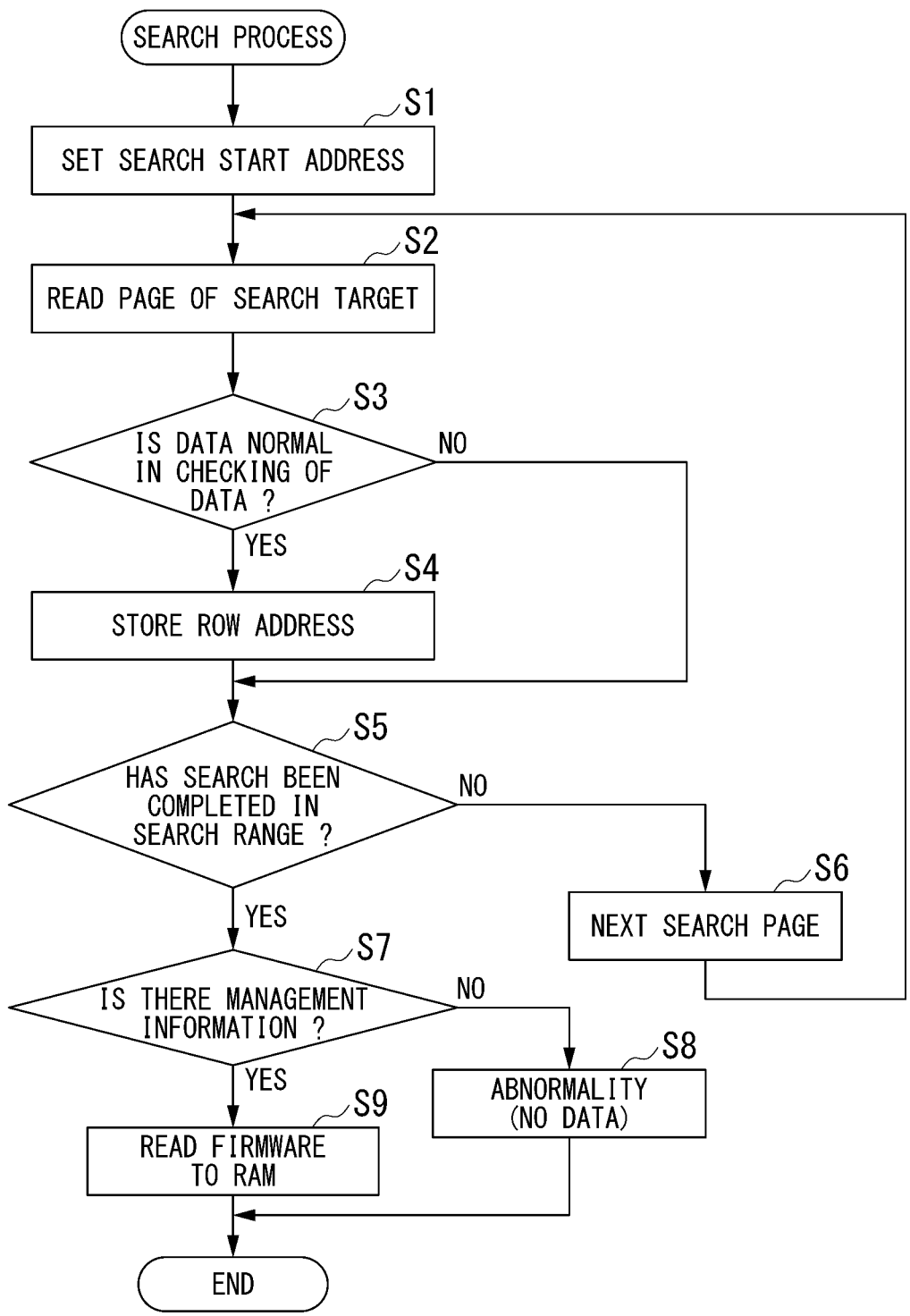
FIG. 9 is a diagram showing an example of a procedure of a process of reading management information according to the embodiment.

FIG. 9 is a diagram illustrating an example of a procedure of a process of reading the management information according to the embodiment. The memory controller 12 searches for the management information stored in the flash memory 11.

In the present embodiment, a plurality of different types of flash memories 211, 311, and 411 can be installed as the flash memory 11.

Also, in the present embodiment, the memory controller 12 writes and reads information in units of pages and erases information in units of blocks.

Also, the management information, the region identification information, and the update number are written simultaneously (here, together in one write process).

In the memory controller 12, a prescribed search range and a range for selecting a management block in the initialization of the memory system 1 are set. The prescribed search range is a range in which the memory controller 12 searches for the management information in the present embodiment. As the prescribed search range, a range of a plurality of continuous blocks is set using blocks of a prescribed number of pages.

When the memory controller 12 determines a block for the management block in the initialization of the memory system 1, the block for the management block is determined in the search range. Thereby, the management block is included in the search range.

Also, in the present embodiment, the search range is determined by using a row address. Thus, the number of blocks to be actually searched for is larger in the flash memory 11 having a smaller number of pages per block.

The subsequent process is an example of a method in which the memory controller 12 does not perform parallel reading with respect to a plurality of flash memories 11.
(Step S1)

The memory controller 12 sets a search start address with respect to the flash memory 11. Then, the process proceeds to the processing of step S2.

Here, the search start address is, for example, a minimum value of the address and may be "0". That is, the search may be performed from row address 0 (page 0 of block 0) of chip 0. Also, the chip may not be chip 0 or may have a specified chip number other than 0.

In the present embodiment, a chip number, a row address (a block number and a page number), a column address, and the number of bytes to be read are set as search start address information. Designation of the chip number is necessary, for example, even when only chip 0 is present. The column address indicates a first byte position to be read. For example, the number of bytes to be read is not specified for each flash memory 11 and the memory controller 12 reads data a number of times corresponding to the number of bytes. However, the column address and the number of bytes to be read are fixed to the end.

Also, the search may not be started from the smaller row address or the search may be started from the larger row address as long as a search in all specified ranges is possible.
(Step S2)

The memory controller 12 reads data of a page of a search target. The page of the search target is initially a page of a search start address. Then, the process proceeds to the processing of step S3.

Also, in the present example, it is only necessary to read at least data for determining whether or not a page that has been searched for is a page of the management information, and it may not be necessary to read the data of all pages.
(Step S3)

The memory controller 12 checks whether or not the read data is normal data. In this example, data of the management information is assumed to be normal data.

As a result, when the memory controller 12 determines that the read data is normal data (Step S3: YES), the process proceeds to the processing of step S4. On the other hand, when the memory controller 12 determines that the read data is not normal data (step S3: NO), the process proceeds to the processing of step S5.

Here, the normal data of the management block is confirmed, for example, by the fact that error correction has been performed with an ECC normally and that the region identification information matches the region identification information of the management information. Also, the data of the normal management information may be confirmed by other conditions.
(Step S4)

When it is determined that the read data is normal data, the memory controller 12 stores a chip number, a row address, and an update number of the read page. Then, the process proceeds to the processing of step S5.

At this time, information for reading the second firmware from the flash memory 11 (a saved address of the flash memory 11, a type of flash memory, and the like) from the read management information may also be stored. In this case, there is no need to read the management information again after the search is completed.

Also, at this time, the update number currently stored as the data of the management information that has been searched for may be compared with a currently read update number and only information of the update number that is larger may be stored. In this case, the number of regions in which the data of the management information that has been searched for is stored may be one.

Also, if a magnitude of the capacity of the second RAM 12D or the buffer 12E is sufficient, all the management information can be read to the second RAM 12D or the buffer 12E. When a method of comparing the update numbers is used each time, for example, it is only necessary for the capacity of the second RAM 12D or the buffer 12E to be a capacity for two sectors.
(Step S5)

The memory controller 12 determines whether or not the search has been completed with respect to a prescribed search range.

When a determination result is that the memory controller 12 determines that the search has been completed with respect to the prescribed search range (step S5: YES), the process proceeds to the processing of step S7.

On the other hand, when the memory controller 12 determines that the search has not been completed with respect to the prescribed search range (step S5: NO), the process proceeds to the processing of step S6.

Also, when a search is performed from a plurality of flash memories 11, the memory controller 12 checks both the chip number and the row address and determines whether or not the search in the search range has been completed based on both the chip number and the row address.

Also, a search count may be used to determine the end of the search range.
(Step S6)

The memory controller 12 sets the next page of the search target. The process proceeds to the processing of step S2.

Here, for the next page of the search target, for example, the prescribed number of pages is added to a current row address. For example, when a plurality of types of flash memories assumed to be used are the flash memories 211, 311, and 411 shown in FIGS. 6 to 8, pages become the search target every 64 pages. As another example, furthermore, when a flash memory in which the number of pages included in the management block is 32 may be used, pages become the search target every 32 pages.

Also, when a search is performed with respect to a plurality of chips, the memory controller 12 also updates the chip number to specify the next page of the search target. However, the chip number is not limited to addition or subtraction, and may remain as it is (currently) at that time.

Also, when the search is started from the larger page number and performed toward the smaller page number, the prescribed number of pages is subtracted in contrast to the above-described addition.

(Step S7)

The memory controller 12 determines whether or not there is management information. In the present example, when one or more pieces of the normal management information have been found, it is assumed that there is management information.

When a determination result is that the memory controller 12 determines that there is management information (step S7: YES), the process proceeds to the processing of step S9.

On the other hand, when the memory controller 12 determines that there is no management information (step S7: NO), the process proceeds to the processing of step S8.

(Step S8)

The memory controller 12 determines that there is an abnormality (there is no management block data) because the management information has not been found. Then, the process of the present flow ends.

(Step S9)

When there is management information, the memory controller 12 performs a process of reading the second firmware from the flash memory 11 to the first RAM 12C. Then, the process of the present flow ends. The second firmware may not be read normally.

At this time, when there are a plurality of pieces of data stored as the management information that has been searched for, update numbers thereof are compared and the information with the largest value becomes necessary information.

Also, when the information for reading the second firmware from the flash memory 11 (a saved address of the flash memory 11, a type of flash memory, and the like) is stored as the management information that has been searched for, the second firmware is read using the corresponding information. Otherwise, after the management information is read again from the flash memory 11 and information for reading the second firmware from the flash memory 11 (a saved address of the flash memory 11, a type of flash memory, and the like) is acquired according to the stored chip number and row address, the second firmware is read using the acquired information.

In the present embodiment, the memory controller 12 determines whether or not the second region 11B has been detected based on whether or not the region identification information of the second region 11B has been detected in relation to the region identification information.

That is, the memory controller 12 reads information of a position at which the region identification information of the second region 11B is arranged with respect to a target region portion and determines that the region portion is a region portion included in the second region 11B when the read information is the region identification information of the second region 11B.

On the other hand, the memory controller 12 reads information of a position at which the region identification information of the second region 11B is arranged with respect to a target region portion, and determines that the region portion is not included in the second region 11B and determines that the second region 11B has not been detected when the read information is not region identification information of the second region 11B.

In the present embodiment, the memory controller 12 stores information of a target region portion of the flash memory 11 in the second RAM 12D or the buffer 12E and determines whether or not information located at a prescribed byte position from the beginning within the stored information is region identification information of the second region 11B. For example, the prescribed byte position is predetermined.

For example, in the present embodiment, a case in which the memory controller 12 determines whether or not the target region portion is the second region 11B in a unit of the number of pages (64 pages in the embodiment) which is the greatest common divisor of the number of pages included in one block within the plurality of different types of flash memories 211, 311, and 411 shown in FIGS. 6 to 8 is shown.

As another example, a unit of each divisor of the number of pages (for example, 32 pages or 16 pages) may be used instead of the unit of the number of pages (64 pages in the embodiment) which is the greatest common divisor of the number of pages included in one block within the plurality of different types of flash memories 211, 311, and 411.

In this manner, a unit of each common divisor of the number of pages included in one block may be used with respect to the plurality of different types of flash memories 211, 311, and 411. The greatest common divisor may be used as the common divisor and a common divisor other than the greatest common divisor may be used.

Also, as another example, when the page format of the second region 11B is different from the page formats of the first region 11A and the third region 11C which are other regions, the memory controller 12 can determine whether or not the second region 11B has been detected based on whether or not a region portion which is a search target matches a page format of the second region 11B.

Here, various techniques may be used for determining whether or not the region portion which is a search target matches the page format of the second region 11B.

As an example, the memory controller 12 executes an error correction process using an ECC by designating a region portion as a target every prescribed number of pages in order from the beginning of the region of the flash memory 11 and assuming that the page format of the second region 11B is used with respect to any page included in the region portion. As a result, when error correction can be performed normally, the memory controller 12 determines that the region portion is a region portion included in the second region 11B and determines that the second region 11B has been detected. On the other hand, when the error correction cannot be performed normally, the memory controller 12 determines that the region portion is not included in the second region 11B and determines that the second region 11B has not been detected.

At this time, the memory controller 12 corrects the read data when correction is determined to be possible in relation to ECC processing. Also, the memory controller 12 outputs information indicating that correction is impossible when the number of error bits exceeds the correction capability.

That is, it can be understood that an ECC arrangement method is specified in the page format. For example, it is possible to adopt a configuration in which the number of bytes to be read from the second region 11B so that normal error correction is performed is different from the number of bytes to be read from the third region 11C so that the normal error correction is performed, with respect to the second region 11B and the third region 11C. Here, reading is performed in units of pages and the memory controller 12 outputs information indicating that correction is impossible when a page to which data that is not a search target is written or a page to which no data is written is read.

Also, any page in the region portion may be used as a page on which the error correction process using the ECC is executed with respect to each region portion.

For example, although it is efficient to use the first page of each region portion as a page on which an error correction process using an ECC is executed, pages other than the first page may be used. Also, the error correction process using the ECC may be executed, for example, with respect to one ECC included in each page, or may be executed with respect to two or more ECCs included in each page. It is considered that this case is time efficient as the number of ECCs with which the error correction process is performed decreases and the accuracy of detection of the second region 11B is improved as the number of ECCs with which the error correction process is performed increases.

However, because a process of reading data is generally time-consuming compared with a process of calculating an ECC, it is efficient to prevent unnecessary data from being read.

For example, when information for only one sector is necessary even if a page is read from the flash memory 11, it is efficient to read only data thereof and an ECC of the data. That is, it is not necessary to read all data of the page. If data is read from the flash memory 11, it is desirable to reduce time taken to read (transfer) the data from the flash memory 11 because the data is required to pass through an ECC decoder.

Here, in the configuration in which the memory controller 12 determines whether or not the search target has been found by determining whether or not normal error correction has been performed based on the page format of the second region 11B, a determination of whether or not the search target has been found based on the region identification information may not be necessarily performed. For example, a configuration in which no region identification information is provided in data may be used. The search target is the saved management information required to read the second firmware from the flash memory 11.

Also, the memory controller 12 may determine whether or not normal error correction has been performed based on the page format of the second region 11B, and determine whether or not the second region 11B has been found based on the region identification information. A configuration in which a final determination result indicating that the search target has been found is obtained when it is determined that the search target has been found in results of both the determinations may be used.

Also, in the searching for the management information, even when the page format of the management block is different from the page format of another block, it is also desirable to use region identification information because identification is not necessarily possible by success or failure of ECC error correction.

Summary of Embodiment

In this manner, in the memory controller 1 according to the embodiment, the memory controller 12 for controlling access to the flash memory 11 including a plurality of physical blocks, each of which includes a plurality of pages, based on a command assigned from the host system 2 includes the ROM 12B to which first firmware is written; a RAM (the first RAM 12C in the embodiment) to which second firmware read from the flash memory 11 is written; and the buffer 12E configured to hold data received from the host system 2 or data to be transmitted to the host system 2 and data read from the flash memory 11 or data to be written to the flash memory 11.

The memory controller 12 operates based on the first firmware or the second firmware.

The memory controller 12 allocates any physical block within the flash memory 11 in a prescribed search range to a prescribed physical block (a management block in the embodiment) when the management information is written, writes the management information necessary for accessing the flash memory 11 to the prescribed physical block, and operates to search for the prescribed physical block at the time of activation or the like.

Writing information including the management information is written to the prescribed physical block in the same format regardless of a type of flash memory 11 (for example, a type).

Information written to pages is sequentially read at prescribed page intervals in the prescribed search range in searching for the prescribed physical block.

Therefore, in the memory system 1 according to the embodiment, the memory controller 12 can control access to a plurality of different types of flash memories 11. Thereby, it is possible to improve the versatility of the memory controller 12 for controlling the flash memory 11 for which there are a plurality of types.

In the memory controller 12 according to the embodiment, when the error correction has been performed by means of an ECC included in the read information, it is determined that the management information has been found.

Therefore, the memory controller 12 can determine whether or not the management information has been found based on an ECC specified in the page format of the prescribed physical block.

The memory controller 12 according to the embodiment writes identification information for identifying the management information (region identification information in the embodiment) to a prescribed physical block.

The memory controller 12 operates to search for the management information based on the identification information at the time of activation or the like.

A condition for determining that the management information has been found includes a condition that the read information includes identification information for identifying the management information.

In the memory controller 12, writing information including the management information and the identification information is written to a prescribed physical block in the same format regardless of a type of flash memory 11.

Therefore, the memory controller 12 can determine whether or not the management information has been found based on the identification information for identifying the management information.

In the memory controller 12 according to the embodiment, the prescribed page interval is an interval of the number of pages corresponding to a common divisor of the number of pages included in one block for a plurality of types of flash memories 11 assumed to be used.

Therefore, even if the type of flash memory 11 is not identified, the memory controller 12 can reliably find the identification information for identifying the management information, thereby finding the management information.

The memory system 1 according to the embodiment includes the flash memory 11 including a plurality of physical blocks including a plurality of pages, and the memory controller 12 configured to control access to the flash memory 11 based on a command given from the host system 2.

The memory controller 12 includes the ROM 12B to which the first firmware is written; a RAM (the first RAM 12C in the embodiment) to which the second firmware read from the flash memory 11 is written; and the buffer 12E configured to hold data received from the host system 2 or data to be transmitted to the host system 2 and data read from the flash memory 11 or data to be written to the flash memory 11.

The memory controller 12 operates based on the first firmware or the second firmware.

The memory controller 12 allocates any physical block within the flash memory 11 in a prescribed search range to a prescribed physical block (a management block in the embodiment) when the management information is written, writes the management information necessary for accessing the flash memory 11 to the prescribed physical block, and operates to search for the prescribed physical block at the time of activation or the like. Writing information including the management information is written to the prescribed physical block in the same format regardless of a type of flash memory 11 (for example, a type).

Information written to pages is sequentially read at prescribed page intervals with respect to the prescribed search range in searching for the management information.

Therefore, in the memory system 1 according to the embodiment, the memory controller 12 can control access to a plurality of different types of flash memories 11. Thereby, it is possible to improve the versatility of the memory controller 12 for controlling the flash memory 11 for which there are a plurality of types.

Although the embodiments of the present invention have been described above in detail with reference to the drawings, the specific configurations are not limited to the embodiments and design changes and the like are also included without departing from the scope of the present invention.

Also, functions of any configuration unit in the above-described device (for example, the memory controller 12) may be implemented by recording a program for implementing the functions on a computer-readable recording medium and causing a computer system to read and execute the program. Also, the computer system described here is assumed to include an operating system (OS) and hardware such as peripheral devices. Also, the computer-readable recording medium refers to a storage apparatus including a flexible disk, a magneto-optical disc, a read-only memory (ROM), a portable medium such as a compact disc (CD)-ROM, and a hard disk embedded in the computer system. Furthermore, the "computer-readable recording medium" is assumed to include a medium that holds a program for a fixed period of time, such as a volatile memory (for example, a random access memory (RAM)) inside a computer system serving as a server or a client when the program is transmitted via a network such as the Internet or a communication circuit such as a telephone circuit.

Also, the above-described program may be transmitted from a computer system storing the program in a storage device or the like via a transmission medium or transmitted to another computer system by transmission waves in a transmission medium. Here, the "transmission medium" for transmitting the program refers to a medium having a function of transmitting information, such as a network (a communication network) like the Internet or a communication circuit (a communication line) like a telephone circuit.

Also, the above-described program may be a program for implementing some of the above-described functions. Further, the above-described program may be a program capable of implementing the above-described functions in combination with a program already recorded on the computer system, i.e., a so-called differential file (differential program).

DESCRIPTION OF REFERENCES

1 Memory system
2 Host system
11, 211, 311, 411 Flash memory
11A First region
11B Second region
11C Third region
12 Memory controller
12A Processor
12B ROM
12C First RAM
12D Second RAM
12E Buffer
111, 121 Page format
221-224, 321 to 322, 421 First page
231 to 234, 331 to 332, 431 Region identification information

What is claimed is:

1. A memory controller for controlling access to a flash memory including a plurality of physical blocks, each of which includes a plurality of pages, based on a command assigned from a host system, the memory controller comprising:
a read-only memory (ROM) to which first firmware is written;
a random access memory (RAM) to which second firmware read from the flash memory is written; and
a buffer configured to hold transmission and reception data to and from the host system or the flash memory,
wherein the memory controller is configured to operate based on the first firmware or the second firmware,
wherein the memory controller is configured to allocate a physical block within the flash memory in a prescribed search range as a prescribed physical block where management information is written, write the management information necessary for accessing the flash memory to the prescribed physical block, and operate to search in an order for the prescribed physical block when the second firmware is read from the flash memory,
wherein writing information, the writing information including the management information, is written to the prescribed physical block in a same format regardless of a type of flash memory,
wherein information written to pages is sequentially read at prescribed page intervals in the prescribed search range in searching for the prescribed physical block, wherein the memory controller is configured to write identification information for identifying the prescribed physical block to the prescribed physical block, wherein the memory controller is configured to operate to search for the prescribed physical block based on the identification information at the time of activation, wherein a condition for determining that the prescribed physical block has been found includes a condition that the identification information for identifying the prescribed physical block is included in the sequentially read information, and wherein the identification information is also written to the prescribed physical block in the same format regardless of a type of flash memory.

2. The memory controller according to claim 1, wherein the memory controller is configured to determine that the prescribed physical block is found when error correction is performed by means of an error correction code included in the read information.

3. The memory controller according to claim 1, wherein the prescribed page interval is an interval of the number of pages corresponding to a common divisor of the number of pages included in one block for a plurality of types of flash memories that are used.

4. The memory controller according to claim 2, wherein the prescribed page interval is an interval of the number of pages corresponding to a common divisor of the number of pages included in one block for a plurality of types of flash memories that are used.

5. A memory system including a flash memory including a plurality of physical blocks, each of which includes a plurality of pages, and a memory controller configured to control access to the flash memory based on a command assigned from a host system, wherein the memory controller includes:

a read-only memory (ROM) to which first firmware is written;

a random access memory (RAM) to which second firmware read from the flash memory is written; and a buffer configured to hold transmission and reception data to and from the host system or the flash memory, wherein the memory controller is configured to operate based on the first firmware or the second firmware, wherein the memory controller is configured to allocate a physical block within the flash memory in a prescribed search range as a prescribed physical block where management information is written, write the management information necessary for accessing the flash memory to the prescribed physical block, and operate to search in an order for the prescribed physical block when the second firmware is read from the flash memory, wherein writing information, the writing information including the management information, is written to the prescribed physical block in a same format regardless of type of flash memory, wherein information written to pages is sequentially read at prescribed page intervals in the prescribed search range in searching for the prescribed physical block, wherein the memory controller is configured to write identification information for identifying the prescribed physical block to the prescribed physical block, wherein the memory controller is configured to operate to search for the prescribed physical block based on the identification information at the time of activation, wherein a condition for determining that the prescribed physical block has been found includes a condition that the identification information for identifying the prescribed physical block is included in the sequentially read information, and wherein the identification information is also written to the prescribed physical block in the same format regardless of a type of flash memory.

6. The memory system according to claim 5, wherein the prescribed page interval is an interval of the number of pages corresponding to a common divisor of the number of pages included in one block for a plurality of types of flash memories that are used.

* * * * *